United States Patent [19]
Yamada

[11] Patent Number: 5,781,516
[45] Date of Patent: Jul. 14, 1998

[54] MULTIPLANE OPTICAL DISC APPARATUS AND ACCESS CONTROL METHOD THEREOF

[75] Inventor: Minoru Yamada, Tokyo, Japan

[73] Assignee: NEC Corporation, Tokyo, Japan

[21] Appl. No.: 835,616

[22] Filed: Apr. 9, 1997

[30] Foreign Application Priority Data

Apr. 15, 1996 [JP] Japan ................... 8-092160

[51] Int. Cl.$^6$ ...................................... G11B 7/00
[52] U.S. Cl. ............................ 369/32; 369/94
[58] Field of Search .................. 369/124, 32, 94, 369/275.3, 44.28, 58

[56] References Cited

U.S. PATENT DOCUMENTS

| | | | |
|---|---|---|---|
| 5,606,546 | 2/1997 | Best et al. | 369/32 |
| 5,682,372 | 10/1997 | Yamakawa et al. | 369/94 |
| 5,696,743 | 12/1997 | Kawasaki | 369/32 |
| 5,740,136 | 8/1996 | Tsutsui et al. | 369/94 |

FOREIGN PATENT DOCUMENTS 60-219647  11/1985  Japan .
61-210541  9/1986  Japan .
2-301020  12/1990  Japan .

*Primary Examiner*—Nabil Hindi
*Attorney, Agent, or Firm*—Young & Thompson

[57] ABSTRACT

The present invention is intended to provide a multiplane optical disc apparatus for conducting high-speed information access from a track on one plane to a track on a different plane.

The multiplane optical disc apparatus comprises a focus jump unit for conducting focus jump between the planes of the multiplane optical disc, an address acquiring unit for acquiring an address of a present position, an access length calculating unit for calculating a length from the present position to a target position, a coarse seek unit for conducting coarse seek from the present position to a target position and a fine seek unit for conducting fine seek from a position after the coarse seek to the target position. Furthermore, the apparatus comprises a virtual target position calculating function for calculating a length to a position on a plane of the present position in the radial direction of the target position if the plane of the target position differs from a plane of the present position acquired by the address acquiring unit, and a present plane coarse seek function for coarsely seeking a length of the plane of the present position corresponding to the length calculated by the virtual target position calculating function.

8 Claims, 9 Drawing Sheets

MULTIPLANE OPTICAL DISC APPARATUS AND ACCESS CONTROL METHOD THEREOF

BACKGROUND OF THE INVENTION

The present invention relates to a multiplane optical disc apparatus. The present invention particularly relates to a multiplane optical disc apparatus capable of accessing information at high speed even if an access target recording plane is different from a presently accessed recording plane, and relates to an access control method thereof.

A multiplane optical disc apparatus is provided with a plurality of recording planes, which overlap one another, on an optical disc. In the apparatus, focus jump is conducted to allow information to be read from different recording planes. The focus jump is for changing focusing positions of a read optical pickup. The focusing position is a position at which the pickup is in focus in the direction of an optical disc thickness.

In a multiplane optical disc apparatus of this type, it is necessary to change access to information from a recording plane of the present position to a different recording plane in the shortest possible time.

FIGS. 5 to 7 exemplify the access operation of a prior-art multiplane optical disc apparatus or, particularly, its operation of changing access to information from a plane of the present position to a different plane.

FIG. 5 is a block diagram schematically illustrating the configuration of the prior-art multiplane optical disc apparatus.

As shown in FIG. 5, the prior-art multiplane optical disc apparatus comprises optical pickup 52 for reproducing a signal recorded in multiplane optical disc 51, signal detecting circuit 53 for generating a high-frequency (RF) signal serving as recorded information from the reproduced signal, plural kinds of servo signals, servo control circuit 54 for conducting servo-control based on the servo signals, respectively, sled motor 55 for driving the optical pickup 52 in the radial direction of the optical disc, spindle motor 56 for rotating the optical disc 51, signal processing circuit 57 for generating a data signal from the RF signal, an address signal, a rotation control signal for driving the spindle motor 56 by means of Phase Locked Loop (PLL), track count pulse generating circuit 58 for generating a track count pulse based on a tracking error signal from the signal detecting circuit 53 and control circuit 59 for controlling the operation of the entire multiplane optical disc apparatus mainly by controlling the servo control circuit 54 and the signal processing circuit 57.

The signal detecting circuit 53 generates, from a signal reproduced from the optical pickup 52, an RF signal, a focus error signal indicating a focusing point error of the optical pickup 52 and a tracking error signal indicating a tracking error with respect to the signal track of the optical pickup 52.

The servo control circuit 54 conducts servo control of the optical disc 51 and of the operation of the optical pickup 52. To be more specific, the circuit 54 controls, based on the focus error signal and the tracking error signal, actuator 61 for driving the moving part of the optical head on the optical pickup 52, that is, lens 60 in radial and thickness directions of the optical disc 51, and the sled motor 55 for moving the optical pickup 52 in the radial direction of the optical disc 51. The circuit 54 also controls the rotation speed of the spindle motor 56 for rotating the optical disc 51 based on the rotation control signal generated from the signal processing circuit 57 for driving the spindle motor 56.

The servo control circuit 54 also conducts sledding(, i.e., moving the entire optical pick up 52 in the radial direction of the optical disc 51), track jump (corresponding to coarse seek to be described hereinafter) for moving the optical pickup 52 to a different track and focus jump between planes. The track count pulse generating circuit 58 generates a pulse for counting the number of tracks which have been passed during coarse or fine seek operations.

The operation of the prior-art multiplane optical disc apparatus will now be described with reference to FIGS. 5 through 7.

FIG. 6 is an access path diagram exemplifying access paths on the optical disc in the prior-art multiplane optical disc apparatus. FIG. 7 is a flowchart showing the operation of the control circuit 59 during access in the prior-art multiplane optical disc apparatus.

FIGS. 6 and 7 illustrate an access position movement path while access position is moved from present position 73 on second plane 72 to target position 75 on first plane 71.

A command to access information at the target position 73 is issued to the control circuit 59 while optical pickup 52 is reproducing the signal indicating the present position 73. The control circuit 59 reads the address of the present position 73 in step S201 shown in FIG. 7 and then detects that the present position 73 is on the second plane 72.

In step S202, focus jump to the first plane 71 is conducted through access path 76. In step S203, the control circuit reads the address of the position after the focus jump, detects that the optical head is at position 74 and thereafter calculate the number of tracks necessary to move to the target position 75. It is noted that the step of address reading prior to coarse seek cannot be omitted. This is because the position after seek may be sometimes greatly dislocated without an exact address.

In step S204, the counting of the number of pulses from the track count pulse generating circuit 58 is started. The coarse seek is completed if the number becomes equal to the calculated number of tracks necessary to move to the target position 75. As for length measurement methods during coarse seek operation, there is proposed a method of reading a length by means of an external encoder.

In step S205, the address after coarse seek is read and the number of tracks to move to the target track. In step S206, fine seek (track jump) is conducted to tracks corresponding to the calculated track number.

In step S206, the address of the position after the fine seek is read while tracking is being conducted and the control circuit 59 confirms that the length to the target point 75 is within one track. In step S208, rotational delay is conducted and access is completed when the circuit 59 detects that the lens 10 on the actuator 11 is at the target position 75.

In FIG. 7, steps S202 through S208 are executed through access path 77 shown in FIG. 6.

The prior art has disadvantages in that access time is lengthened by time taken for one address read step. The reason is that operations other than that for moving the optical pickup 52 are included in access operation and that three address read steps are included in access operation.

It has been therefore necessary to provide an access system of a multiplane optical disc apparatus in order to make high-speed access possible by reducing the number of address read steps while access operation is being conducted. However, such an system has never been adopted in the prior art.

Meanwhile, Japanese Patent Unexamined (KOKAI) Publication No. 60-219647 discloses a multiplane optical recording medium, having a plurality of recording planes piled up via a transparent medium separation plane, wherein each of the recording planes are provided with an optical guide to thereby make high-density multiple recording possible. The 60-219647 invention does not at all disclose means for changing access to information from a track on the present plane to a track at a different position of a different plane at high speed in a multiplane optical disc.

Additionally Japanese Patent Unexamined (KOKAI) Publication No. 61-210541 discloses fetching from focus error signals in a focus control circuit, only a signal corresponding to a modulation frequency in tracking grooves on a desired recording plane via a band-pass filter, and making easier access to information of recording planes in the multiplane optical recording medium, thereby reproducing records. However, the recording medium of the 61-210541 invention has a complicated structure and it does not at all disclose high-speed information access from a track on the present plane to a track at a different position of a different plane.

Moreover, Japanese Patent Unexamined (KOKAI) Publication No. 02-301020 discloses that fixed tracking information is provided on at least one recording surface of a multiplane optical recording medium, that at least one optical beam of a plurality of optical beams is irradiated on a recording surface different form those on which other optical beams are irradiated and that an optical pickup is provided for conducting tracking and data recording and reproduction using these optical beams. However, the 02-301020 invention does not at all teach realizing high-speed information access from a track on the present plane to a track at a different position on a different plane.

SUMMARY OF THE INVENTION

The present invention has been made to overcome the disadvantages of prior art. It is the object of the present invention to provide an access method of an optical disc apparatus to realize high-speed access to information on different tracks on different planes on a multiplane optical disc.

According to the access method of the present invention, coarse seek is conducted to a plane of the present position and, after the coarse seek is completed, focus jump is conducted without reading an address. In the optical disc apparatus of the present invention, after address read means reads the address of the present position, coarse seek means conducts coarse seek on the plane of the present position. Thus, the number of address read steps during access can be reduced.

The present invention provides a multiplane optical disc apparatus wherein an optical pickup reads and writes data on a multiplane optical disc provided with at least two planes capable of data recording independently of each other. The apparatus is characterized by comprising:

focus jump means for conducting focus jump of the optical pickup between the planes of the multiplane optical disc;

address acquiring means for acquiring an address of a present position of the optical pickup;

access length calculating means for calculating a length from the present position acquired by the address acquiring means to a target position indicated from a host apparatus;

coarse seek means for conducting coarse seek on a length from the present position to a position closer to the target position, the length corresponding to the length calculated by the access length calculating means; and fine seek means for conducting fine seek from a position, at which the optical pickup is positioned after the coarse seek, to the target position; and wherein the access length calculating means has a virtual target position calculating function for calculating a length to a position on a plane of the present position, the length being in the radial direction of the target position, if the plane of the target position differs from a position of the present position acquired by the address acquiring means, and the coarse seek means has a present plane coarse seek function for coarsely seeking a length of the plane of the present position, the length corresponding to the length calculated by the virtual target position calculating function.

The multiplane optical disc apparatus according to the present invention is characterized further in that the focus jump means has a after-coarse seek jump function for conducting focus jump to the plane of the target position after the optical pickup is positioned by the present plane coarse seek function.

The multiplane optical disc apparatus according to the present invention is characterized further in that the access length calculating means has a track number calculating function for calculating the length from the present position to the target position by calculating the number of tracks passed, and the coarse seek means has a counter for counting the number of tracks passed during the coarse seek, and comparison means for comparing the track number calculated by the track number calculating function and the track number counted by the counter.

The multiplane optical disc apparatus according to the present invention is characterized further in that the access length calculating means has a pulse number calculating function for calculating the length from the present position to the target position by calculating the number of pulses from an external encoder, and the coarse seek means has a counter for counting the number of pulses outputted during the coarse seek, and comparison means for comparing the pulse number calculated by the pulse number calculating function with the pulse number counted by the counter.

The present invention provides an access method of an optical pickup in a multiplane optical disc apparatus for reading and writing data on a multiplane optical disc provided with at least two planes capable of data recording independently of each other. The method is characterized by comprising the steps of:

reading an address of a first present position of the optical pickup;

calculating a first length from the first present position to a target position indicated from a host apparatus;

conducting coarse seek on a length from the first present position to a position closer to the target position, the length corresponding to the calculated first length;

conducting, after the coarse seek step, focus jump to a plane of the target position using the optical pickup;

reading, after the focus jump step, an address of a second present position of the optical pickup;

calculating a second length from the second present position to the target position;

conducting fine seek on a length from a second position of the optical pickup, the length corresponding to the second length;

reading, after the fine seek step, an address of a third present position of the optical pickup, and confirming that a length from the third present position to the target position is within one track; and conducting rotational delay until the optical pickup reaches the target position.

BRIEF DESCRIPTION OF THE DRAWINGS

The novel features believed to be characteristics of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENTS

Figure 1:
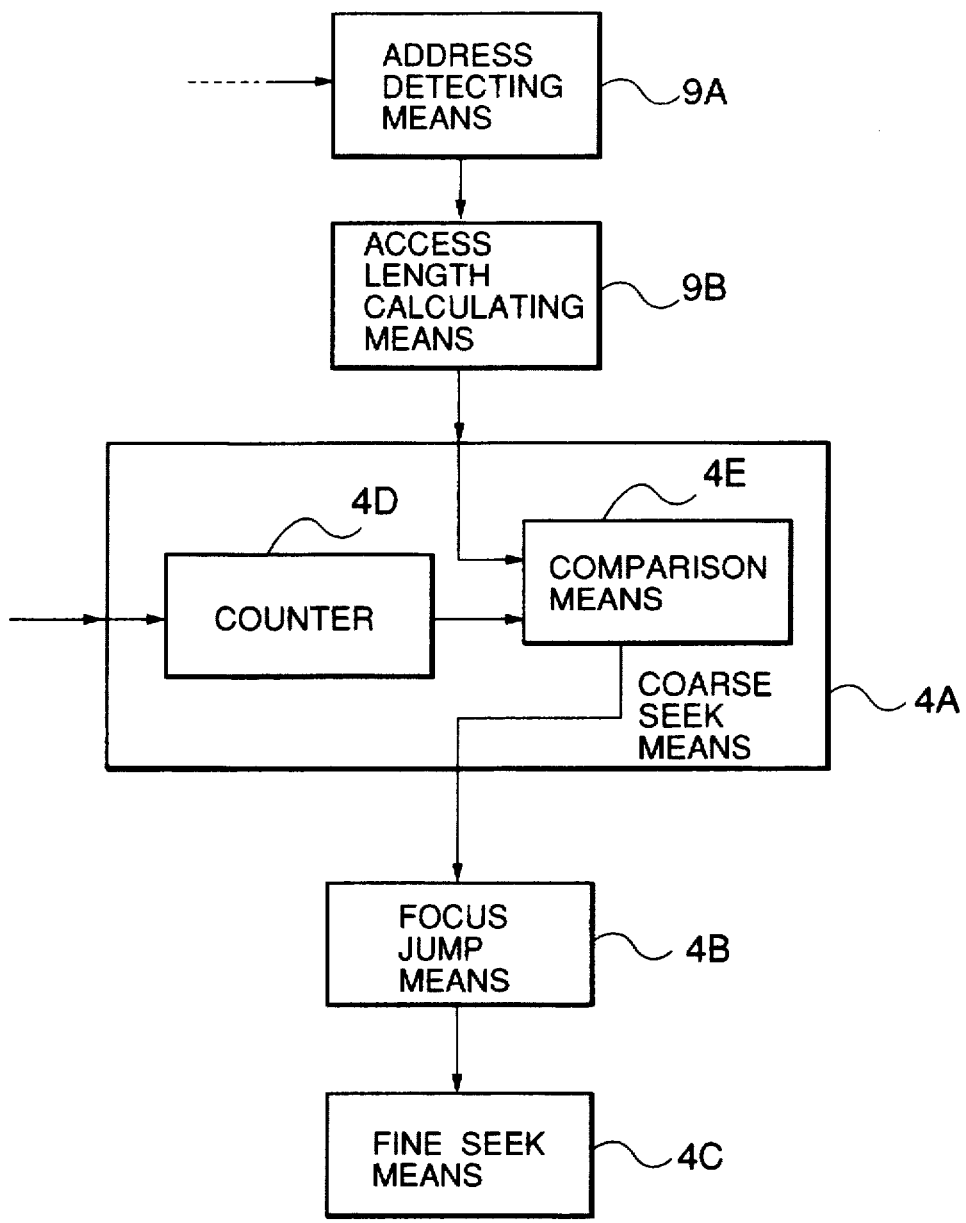
FIG. 1 is a block diagram illustrating the first embodiment according to the present invention.

FIG. 1 shows the construction of a first embodiment according to the present invention. FIG. 1 is a block diagram schematically illustrating the construction of a multiplane optical disc apparatus to enforce the present invention.

The multiplane optical disc apparatus comprises focus jump means 4B for carrying out focus jump between planes of the multiplane optical disc, address detecting means 9A for detecting an address of a present position of an optical pickup, access length calculating means 9B for calculating a length from the present position detected by the address detecting means 9A to a target position, coarse seek means 4A for carrying out coarse seek on a length from the present position to the target position corresponding to the length calculated by the access length calculating means 9B and fine seek means 4C for carrying out fine seek from the position, at which the optical pickup is positioned by the coarse seek means 4A, to the target position.

The access length calculating means 9B has a virtual target position calculating function for calculating a length from a position in the radial direction of the target position to the target position if access is performed to the information at the target position indicated from a host apparatus on a plane different from a plane of the present position detected by the address detecting means 9A. The coarse seek means 4A has a present plane coarse seek function for coarsely seeking a length from the plane of the present position corresponding to the length calculated by the virtual target position calculating function.

Compared with the prior art apparatus wherein coarse seek is carried out after focus jump and address detection, the apparatus of the present invention can reduce the address detecting processing by one step and realize high-speed access to information in the multiplane optical disc.

The focus jump means 4B has a after-coarse seek jump function for carrying out focus jump to the plane of the target position when the optical pickup 2 is positioned at the virtual target position by the present plane coarse seek function. Using the after-coarse seek jump function, focus jump to the plane of the target position is carried out after the pickup reaches the virtual target position.

The access length calculating means 9B has a track number calculating function for calculating the length from the present position to the target position by calculating the number of tracks. The coarse seek means 4A has a counter for counting the number of tracks passed during coarse seek, and comparison means for comparing the number of tracks calculated by the track number calculating function with the number of tracks counted by the counter.

After the comparison, if the track number calculated by the track number calculating function becomes equal to the track number counted by the counter, the coarse seek is completed.

Figure 2:
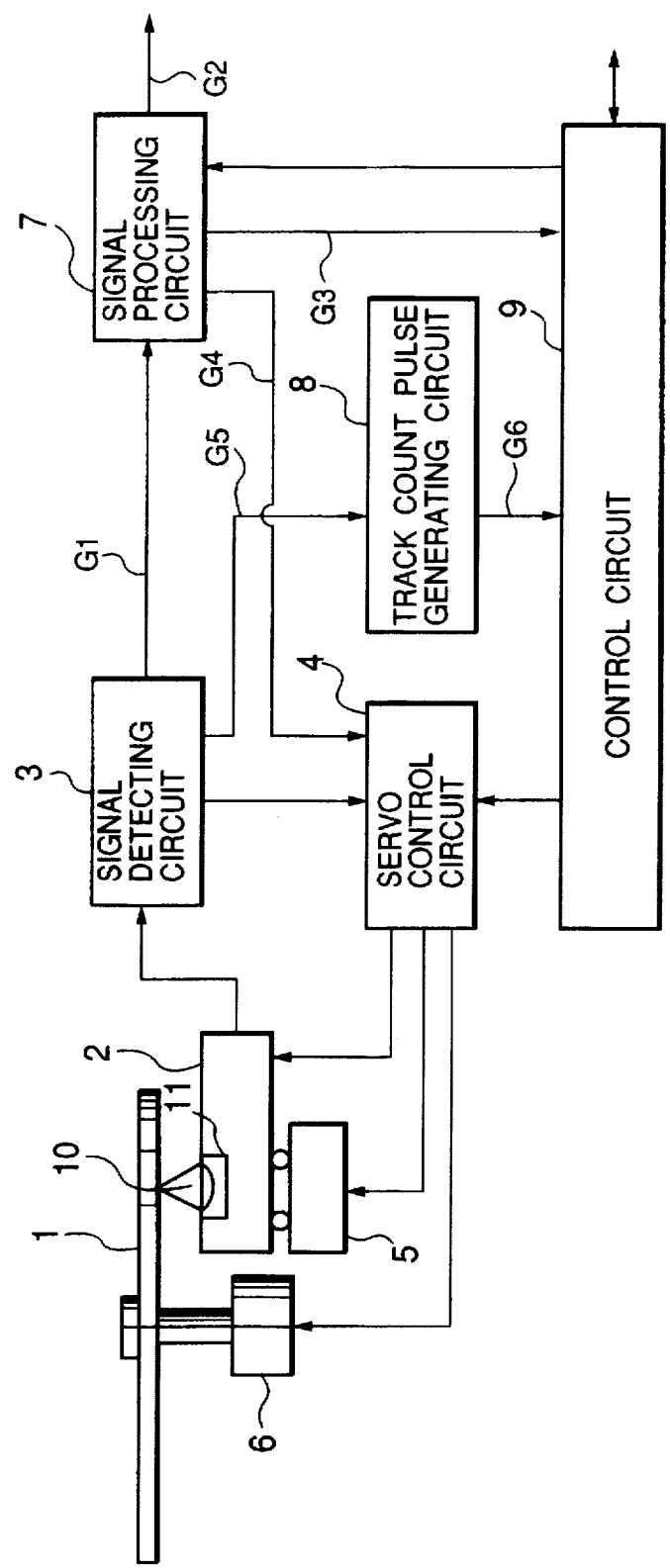
FIG. 2 is a block diagram illustrating the configuration of hardware resources of the multiplane optical disc apparatus shown in FIG. 1.

FIG. 2 is a block diagram illustrating the construction of hardware resources of the multiplane optical disc apparatus shown in FIG. 1. The apparatus comprises multiplane optical disc 1, optical pickup 2 for reproducing a signal recorded in the optical disc 1, signal detecting circuit 3 for generating a high-frequency (RF) signal G1 serving as recorded information from the reproduced signal and plural kinds of servo signals, servo control circuit 4 for carrying out servo control based on the servo signals, respectively, sled motor 5 for driving the optical pickup 2 in the radial direction of the optical disc 1 and spindle motor 6 for rotating the optical disc 1.

The multiplane optical disc apparatus further comprises signal processing circuit 7 for generating a data signal G2, an address signal G3 and a rotation control signal G4 for driving the spindle motor 5 by means of PLL from the RF signal G1, track count pulse generating circuit 8 for generating a track count pulse G6 based on a tracking error signal G5 from the signal detecting circuit 3, control circuit 9 for control the operation of the entire apparatus by mainly controlling the servo control circuit 4 and the signal processing circuit 7. The control circuit 9 also acts as address acquiring means 9A for acquiring an address based on the address signal generated by the signal processing circuit, and access length calculating means 9B.

The signal detecting circuit 3 generates the RF signal G1, a focus error signal and the tracking error signal indicating a tracking error with respect to the signal track of the optical pickup 2 from the signal reproduced in the optical pickup 2.

The servo control circuit 4 servo-controls the optical disc 1. That is, the circuit 4 controls actuator 11 including lens 10 which is a moving part used for focusing and tracking the optical head of the optical pickup 2, and the sled motor for driving the optical pickup 2 in the radial direction of the optical disc, by using the focus error signal and the tracking error signal outputted from the signal detecting circuit 3, and controls the rotation speed of the spindle motor 6 based on the rotation control signal generated in the signal processing circuit 7.

The servo control circuit 4 also controls sledding, track jump and focus jump between planes required for the optical head to reach the target track during access. The servo control circuit 4 acts as coarse seek means 4A, focus jump means 4B and fine seek means 4C. The circuit 4 can be realized in a control computer.

The track count pulse generating circuit 8 generates a pulse for counting the number of tracks passed during coarse seek or fine seek while information access is being conducted.

The operation of the multiplane optical disc apparatus of the present invention will be described with reference to FIGS. 3 and 4.

Figure 3:
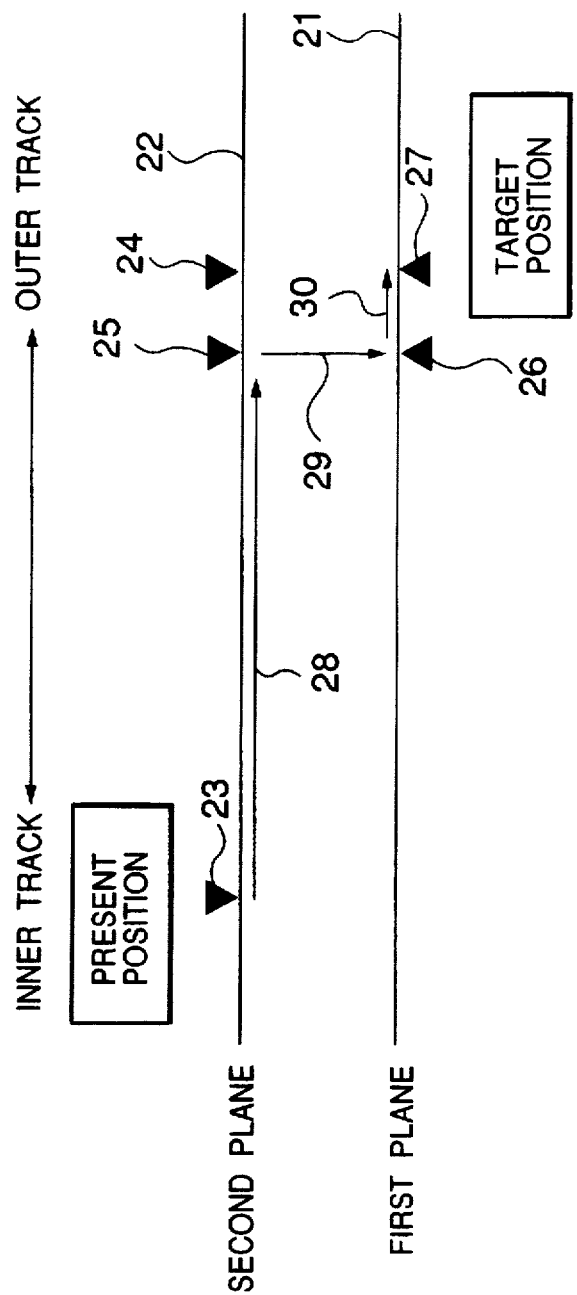
FIG. 3 is an access path diagram showing an example of access paths on an optical disc in the multiplane optical disc apparatus of the present invention.
Figure 4:
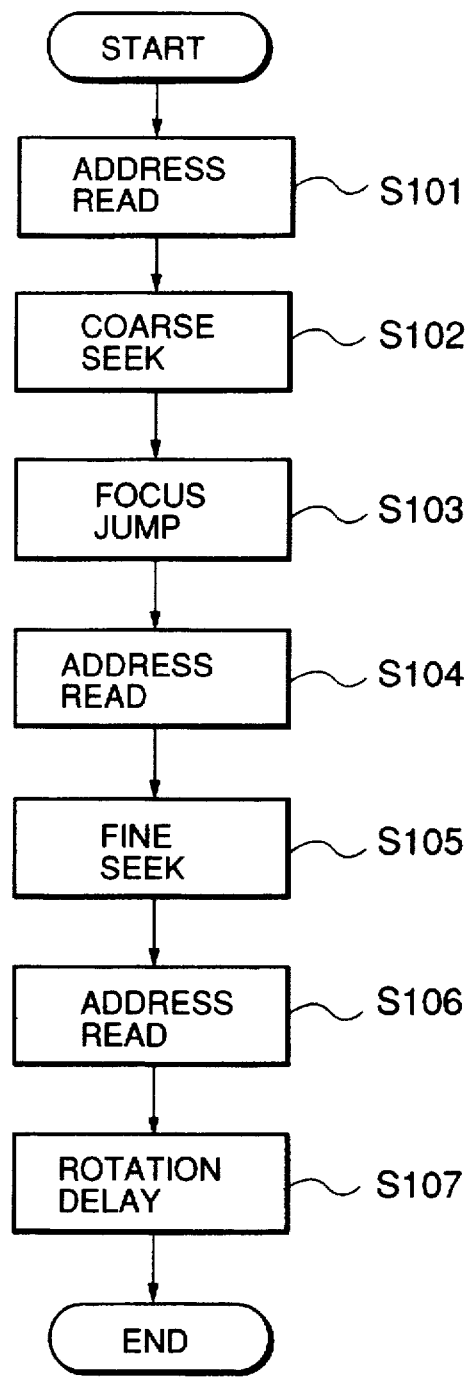
FIG. 4 is a flowchart illustrating the operation of the control circuit while access is being conducted in the multiplane optical disc apparatus of the present invention.
Figure 5:
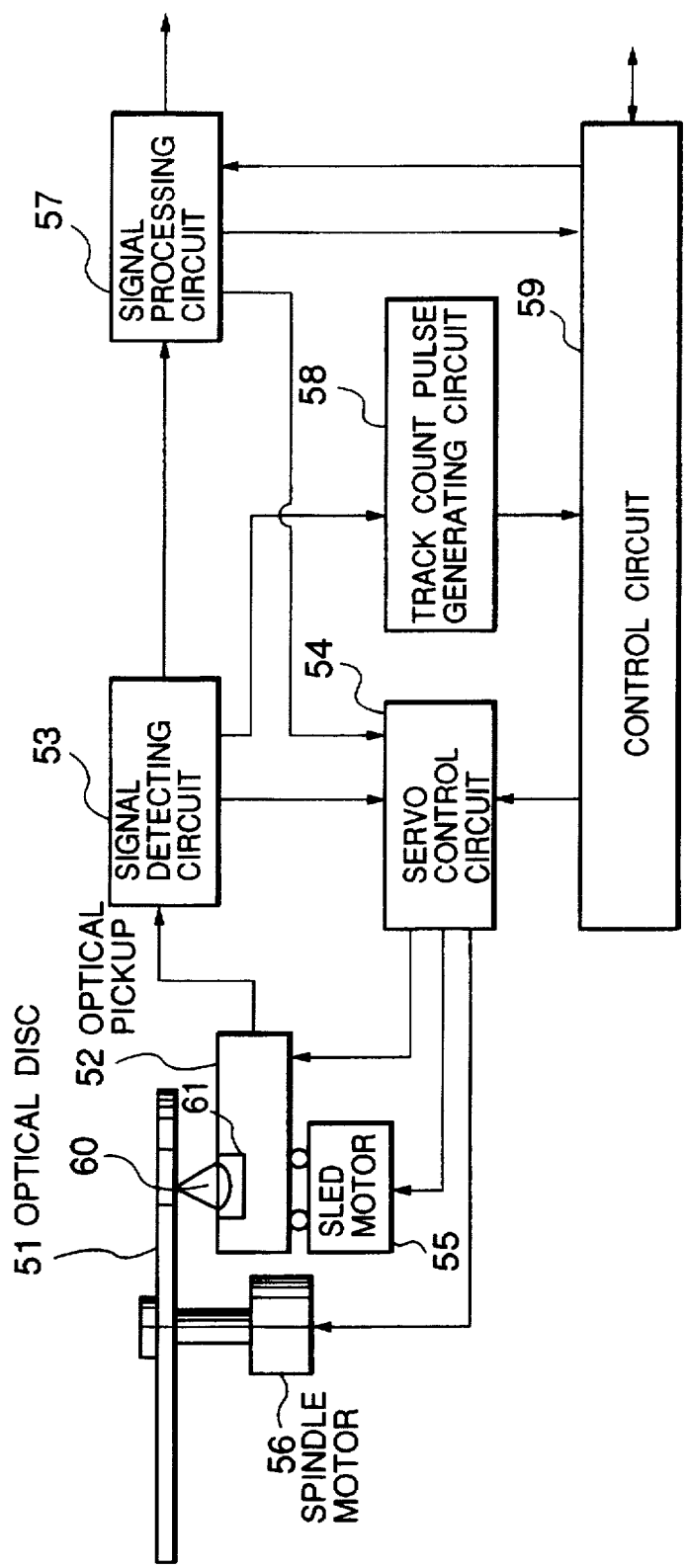
FIG. 5 is a block diagram schematically illustrating the configuration of the prior-art multiplane optical disc apparatus.

FIG. 3 is an access path diagram illustrating access paths on the optical disc in the multiplane optical disc apparatus of the present invention. FIG. 4 is a flowchart illustrating the operation of the control circuit while information access is being conducted in the apparatus of the present invention.

FIG. 3 shows an access position movement path while access position is moved from present position 23 on second plane 22 to target position 27 on first plane 21.

A command to access information at the target position 27 is issued to the control circuit 9 while optical pickup 2 is reproducing the signal indicating the present position 23. The control circuit 9 reads the address of the present position 23 in step S101 shown in FIG. 4 and then calculates the number of tracks from the present position 23 to virtual target position 24 having a length in the radial direction of the target position 27.

In step S102, the counting of the number of pulses from the track count pulse generating circuit 8 is started. The coarse seek is completed if the number becomes equal to the calculated number of tracks from the present position 23 to the virtual target position 24. Here, reference numeral 25 denotes a position at which the coarse seek is completed while the coarse seek is conducted through the access path 28.

In step S103, focus jump to the first plane 21 is conducted through access path 29. After the focus jump, in step S104, the control circuit 9 detects that the head is at position 26 by reading the address, and calculates the number of tracks from the position 26 to the target position 27.

In step S105, fine seek is conducted to tracks corresponding to the calculated track number. After the fine seek, in step S106, the circuit confirms that the length to the target position 27 is within one track by reading the address.

Figure 8:
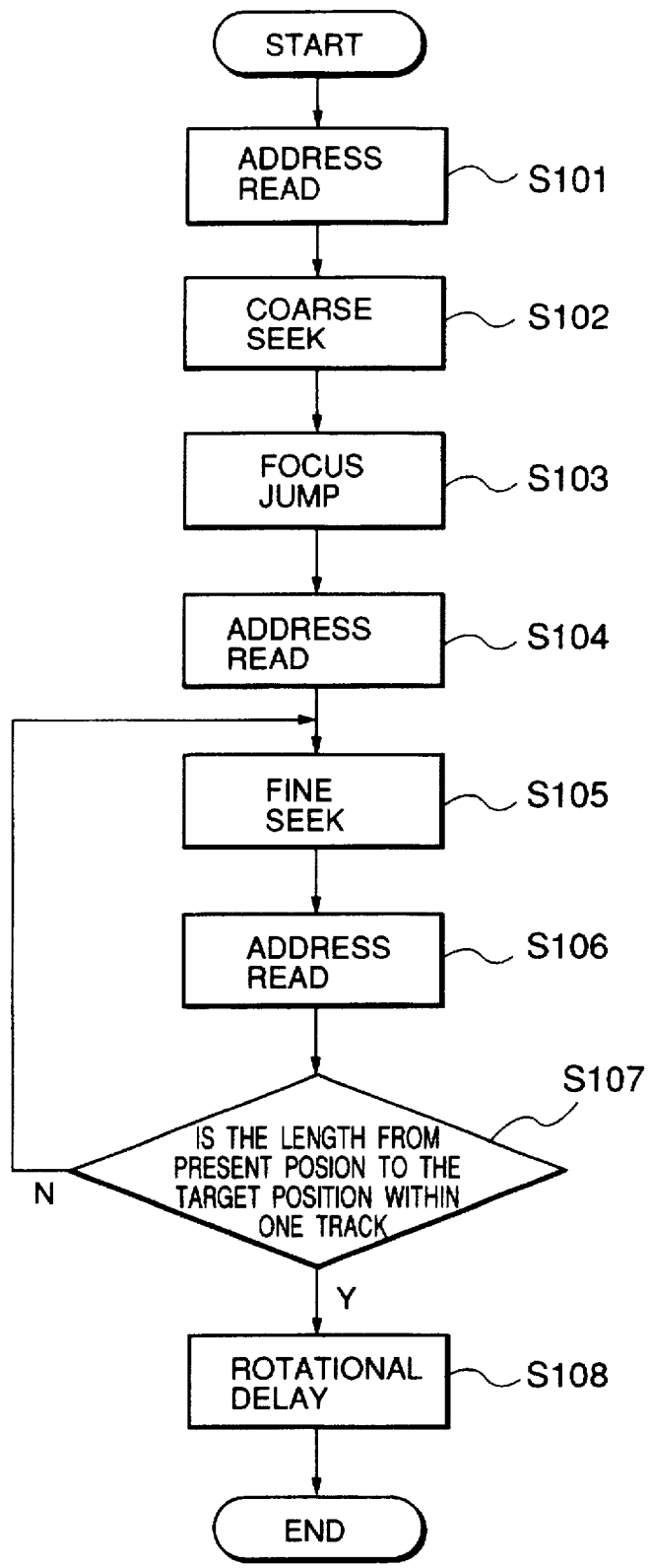
FIG. 8 is a flowchart illustrating the operation of the control circuit while access is being conducted in the multiplane optical disc apparatus of the present invention.

As an optional method is shown in FIG. 8, the control circuit 9 judges if the length to the target position 27 exceeds one track in step S107. If it exceeds one track, it is possible to return to step S105 to carry out fine seek again.

Returning to FIG. 4, in step S107, the control circuit 9 conducts rotational delay on the access path 30 and completes access when the target position 27 is detected.

As can be seen from the above description, if information access is conducted through access paths in the access method of the present invention, it is possible to reduce address read processing by one step and to thereby shorten access time.

Figure 6:
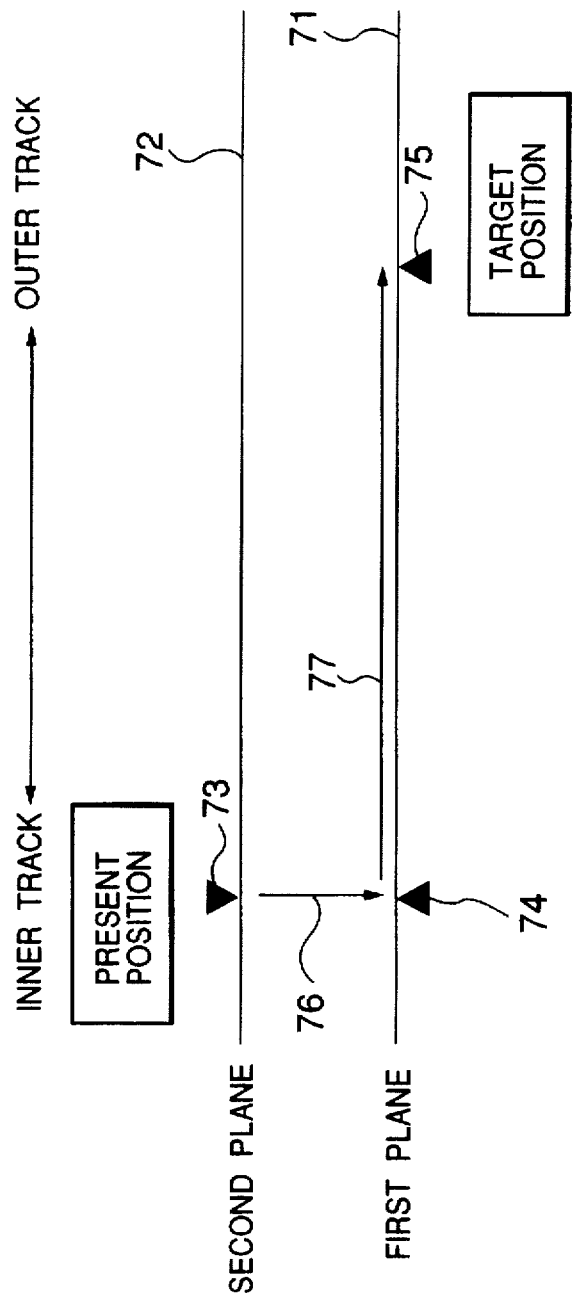
FIG. 6 is an access path diagram showing an example of access paths on an optical disc in the prior-art multiplane optical disc apparatus.
Figure 7:
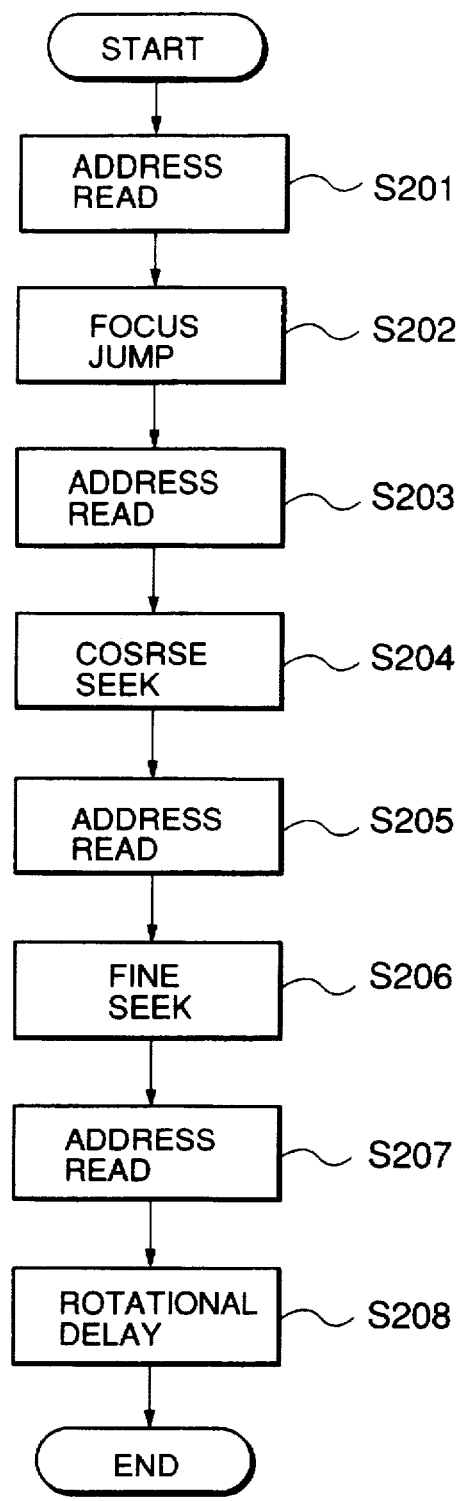
FIG. 7 is a flowchart illustrating the operation of the control circuit while access is being conducted in the prior-art multiplane optical disc apparatus.

In case of the access paths shown in FIG. 3, the position 25 after coarse seek may be in the outer track with respect to the virtual target position 24. The same thing is true for the position 74 in coarse seek shown in FIG. 6. Although the length from the position 25 to the position 24 is preferably as short as possible, it is influenced by the precision of coarse seek.

In the above embodiment, the coarse seek length is calculated based on the number of tracks. There is also adopted a method of calculating the length based on the number of pulses outputted from an external encoder.

In this case, the access length calculating means 9B has a pulse number calculating function for calculating a length from the present position to the target position by using the number of pulses outputted from the external encoder. The coarse seek means has a counter for counting the number of pulses detected during coarse seek and comparison means for comparing the pulse number calculated by the pulse number calculating function with the number of pulses counted by the counter. When the pulse number calculated by the pulse number calculating function is equal to the number of pulses counted by the counter, the coarse seek is completed. The external encoder is a circuit wherein pulses are outputted equidistantly from an external slit sensor or a rotary sensor while the optical head is moving. The detected length is in ten-odd µm to tens of µm, depending on the sensor. The precision of this method is, on one hand, lower than that of the method of counting the number of tracks (e.g. 1.6 µm in case of a compact disc). On the other hand, this method advantageously ensures pulse detection and therefore stabilizes operations.

Figure 9:
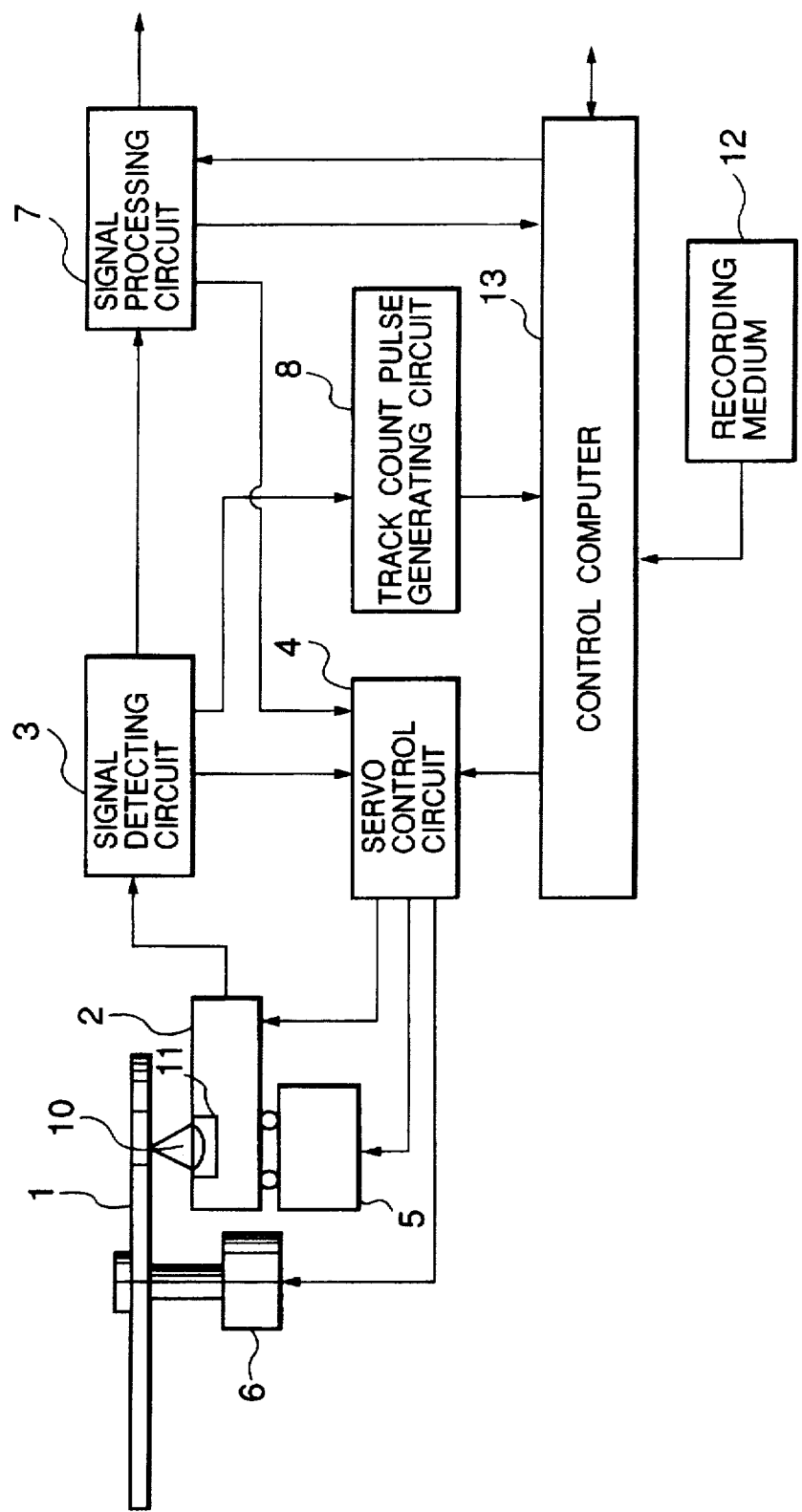
FIG. 9 is a block diagram illustrating the configuration of hardware resources of the multiplane optical disc apparatus of the present invention.

Next, a second embodiment according to the present invention will be described in detail with reference to appended drawings. Referring now to FIG. 9, the multiplane optical disc apparatus in this embodiment comprises recording medium 12 for recording a control program. A semiconductor memory, a magnetic disc or the like can be used as the recording medium 12.

The control program is read from the recording medium 12 to control computer 13 to control the operation of the computer 13. Controlled by the control program, the computer 13 having the same function as that of the control circuit 9 shown in FIG. 2, executes steps S101 to S107 shown in FIG. 4. The processing steps are the same as those in the first embodiment.

As can be understood from the above description, the present invention has an advantage of shorter access time. This is because address read time can be reduced by one address reading step, by passing the access path for a coarse seek operation instead of carrying out focus jump after the step of reading the address of the first present position. The present invention has another advantage in that it can be realized without modifying the construction of the prior art apparatus. This is because the counting of track number and the change of access paths can only be dealt with in software.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A multiplane optical disc apparatus wherein an optical pickup reads and writes data on a multiplane optical disc provided with at least two planes capable of data recording independently of each other, said apparatus comprising:

focus jump means for conducting focus jump of said optical pickup between the planes of said multiplane optical disc;

address acquiring means for acquiring an address of a present position of said optical pickup;

access length calculating means for calculating a length from said present position acquired by said address acquiring means to a target position indicated from a host apparatus;

coarse seek means for conducting coarse seek on a length from said present position to a position closer to said target position, said length corresponding to the length calculated by said access length calculating means; and fine seek means for conducting fine seek from a position, at which said optical pickup is positioned after the coarse seek, to said target position; and wherein said access length calculating means has a virtual target position calculating function for calculating a length to a position on a plane of said present position, said length being in the radial direction of said target position, if the plane of said target position differs from a position of said present position acquired by said address acquiring means, and said coarse seek means has a present plane coarse seek function for coarsely seeking a length of the plane of said present position, said length corresponding to the length calculated by said virtual target position calculating function.

2. The multiplane optical disc apparatus according to claim 1, wherein said focus jump means has a after-coarse seek jump function for conducting focus jump to the plane of said target position after said optical pickup is positioned by said present plane coarse seek function.

3. The multiplane optical disc apparatus according to claim 1, wherein said access length calculating means has a track number calculating function for calculating the length from said present position to said target position by calculating the number of tracks passed, and said coarse seek means has a counter for counting the number of tracks passed during the coarse seek, and comparison means for comparing the track number calculated by said track number calculating function and the track number counted by said counter.

4. The multiplane optical disc apparatus according to claim 1, wherein said access length calculating means has a pulse number calculating function for calculating the length from said present position to said target position by calculating the number of pulses from an external encoder, and said coarse seek means has a counter for counting the number of pulses outputted during the coarse seek, and comparison means for comparing the pulse number calculated by said pulse number calculating function with the pulse number counted by said counter.

5. An access method of an optical pickup in a multiplane optical disc apparatus for reading and writing data on a multiplane optical disc provided with at least two planes capable of data recording independently of each other, said method comprising the steps of:

reading an address of a first present position of said optical pickup;

calculating a first length from said first present position to a target position indicated from a host apparatus;

conducting coarse seek on a length from said first present position to a position closer to the target position, said length corresponding to said calculated first length;

conducting, after the coarse seek step, focus jump to a plane of said target position using said optical pickup;

reading, after the focus jump step, an address of a second present position of said optical pickup;

calculating a second length from said second present position to said target position;

conducting fine seek on a length from a second position of said optical pickup, said length corresponding to said second length;

reading, after the fine seek step, an address of a third present position of said optical pickup, and confirming that a length from the third present position to said target position is within one track; and conducting rotational delay until the optical pickup reaches said target position.

6. An access method of an optical pickup in a multiplane optical disc apparatus for reading and writing data on a multiplane optical disc provided with at least two planes capable of data recording independently of each other, said method comprising the steps of:

reading an address of a first present position of said optical pickup;

calculating a first length from said first present position to a target position indicated from a host apparatus;

conducting coarse seek on a length from said first present position to a position closer to the target position, said length corresponding to said calculated first length;

conducting, after the coarse seek step, focus jump to a plane of said target position using said optical pickup;

reading, after the focus jump step, an address of a second present position of said optical pickup;

calculating a second length from said second present position to said target position;

conducting fine seek on a length from a second position of said optical pickup, said length corresponding to said second length;

reading, after the fine seek step, an address of a third present position of said optical pickup, and confirming if a length from the third present position to said target position is within one track; and returning to the coarse seek step if the length from the third position to said target position exceeds one track, and conducting rotational delay until the optical pickup reaches said target position if the length from the third position to said target position is within one track.

7. A recording medium for recording a program for executing processing to an access control computer in a multiplane optical disc apparatus for reading and writing data on a multiplane optical disc provided with at least two planes capable of data recording independently of each other, said processing comprising the processing steps of:

reading an address of a first present position of said optical pickup;

calculating a first length from said first present position to a target position indicated from a host apparatus;

conducting coarse seek on a length from said first present position to a position closer to the target position, said length corresponding to said calculated first length;

conducting, after the coarse seek step, focus jump to a plane of said target position using said optical pickup;

reading, after the focus jump step, an address of a second present position of said optical pickup;

calculating a second length from said second present position to said target position;

conducting fine seek on a length from a second position of said optical pickup, said length corresponding to said second length;

reading, after the fine seek step, an address of a third present position of said optical pickup, and confirming that a length from the third present position to said target position is within one track; and conducting rotational delay until the optical pickup reaches said target position.

8. A recording medium for recording a program for executing processing to an access control computer in a multiplane optical disc apparatus for reading and writing data on a multiplane optical disc provided with at least two planes capable of data recording independently of each other, said processing comprising the processing steps of:

reading an address of a first present position of said optical pickup;

calculating a first length from said first present position to a target position indicated from a host apparatus;

conducting coarse seek on a length from said first present position to a position closer to the target position, said length corresponding to said calculated first length;

conducting, after the coarse seek step, focus jump to a plane of said target position using said optical pickup;

reading, after the focus jump step, an address of a second present position of said optical pickup;

calculating a second length from said second present position to said target position;

conducting fine seek on a length from a second position of said optical pickup, said length corresponding to said second length;

reading, after the fine seek step, an address of a third present position of said optical pickup, and confirming if a length from the third present position to said target position is within one track; and returning to the coarse seek step if the length from the third position to said target position exceeds one track, and conducting rotational delay until the optical pickup reaches said target position if the length from the third position to said target position is within one track.

* * * * *